E. H. BRISTOL.
MEASURING OR CONTROLLING INSTRUMENT.
APPLICATION FILED JUNE 21, 1912.

1,234,126.

Patented July 24, 1917.

Witnesses:
Carl L. Choate.
Horace A. Crossman.

Inventor:
Edgar H. Bristol
by Emery, Booth, Janney & Varney
Attys.

UNITED STATES PATENT OFFICE.

EDGAR H. BRISTOL, OF FOXBORO, MASSACHUSETTS, ASSIGNOR, BY MESNE ASSIGNMENTS, TO THE FOXBORO COMPANY, OF FOXBORO, MASSACHUSETTS, A CORPORATION OF MASSACHUSETTS.

MEASURING OR CONTROLLING INSTRUMENT.

1,234,126.   Specification of Letters Patent.   Patented July 24, 1917.

Application filed June 21, 1912.   Serial No. 704,953.

*To all whom it may concern:*

Be it known that I, EDGAR H. BRISTOL, a citizen of the United States, and a resident of Foxboro, in the county of Norfolk and State of Massachusetts, have invented an Improvement in Measuring or Controlling Instruments, of which the following description, in connection with the accompanying drawings, is a specification, like characters on the drawings representing like parts.

My invention relates to that class of instruments where an element responsive to changes in temperature, pressure or the like, is used to perform some desired indicating, recording, or other office.

To illustrate one practical mode of utilizing the features of the invention, the same will be described herein as embodied in a pressure-responsive instrument. It is to be understood that the invention is not limited to the specific construction and organization illustrated in the drawings, nor to the specific operation and use described herein for exemplification.

The invention will be best understood by reference to the following description, when taken in connection with the accompanying illustration of one specific embodiment thereof, while its scope will be more particularly pointed out in the appended claims.

In the drawings:—

Fig. 3 is a detail plan of the mechanism shown in Fig. 2;

Figure 1:
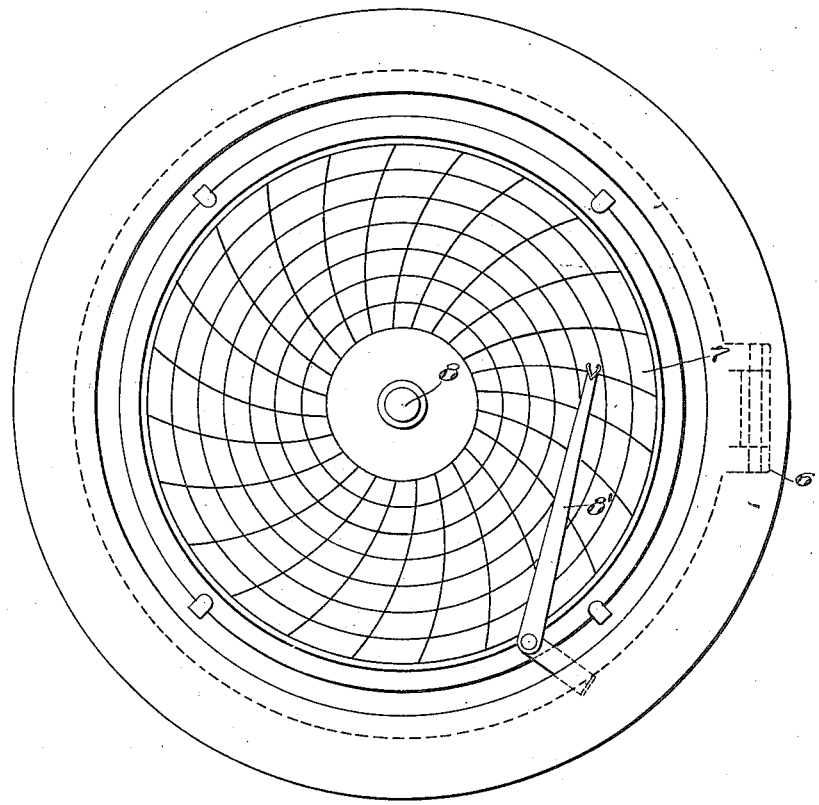
Figure 1 shows in front elevation an instrument embodying my invention suitably incased.
Figure 2:
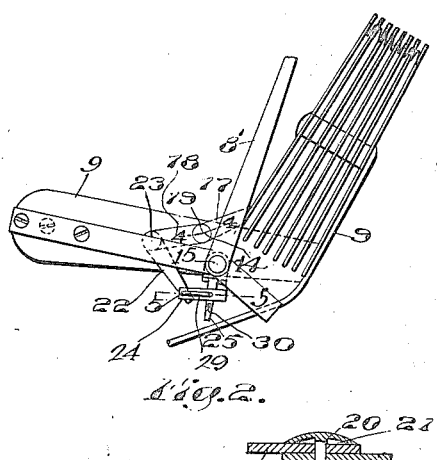
Fig. 2 is a detail elevation on an enlarged scale of the recording mechanism.
Figures 4, 5:
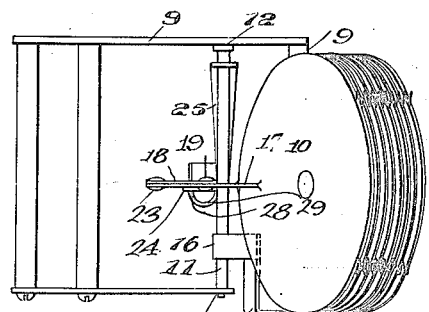

Fig. 4 is a detail section partly in elevation on an enlarged scale on line 4—4 of Fig. 2; and Fig. 5 is a detail section on an enlarged scale upon line 5—5 of Fig. 2.

Referring to the drawings and to the embodiment of my invention which I have there shown for illustrative purposes, I have there shown an instrument having a casing 6 of any usual or desired construction, in which there is suitably mounted a graduated chart 7 carried by a spindle 8, which it will be understood is rotated by suitable means, such as the time train of a clock movement (not shown), angular movement of the chart representing periods of time. An index, or pointer device, in the illustrative embodiment a pen index $8^1$, suitably mounted and driven as presently described, may be arranged to travel in a generally radial direction over the chart 7, in order to indicate or record thereon a pressure prevailing at or during any instant or period of time.

For the purposes of the specific instrument, there is mounted in the casing 6 upon a suitable support 9 a pressure-responsive element exemplified by a tube 10 made up of a series of expansible sections or diaphragms and adapted to be elongated or contracted by an increase or diminution of internal pressure, reference being had to the patent to W. H. Bristol, No. 420,570, dated February 4, 1890, which shows an instrument of this general type. One end of this pressure-responsive element is fixedly secured to the support 9, while the other end, which is movable, is connected by suitable means to the pointer device 8. Herein the latter is carried by a shaft 11, journaled in suitable bearings 12 and 13 in the support 9. Preferably the pointer device 8 is directly carried by an arm 14, upon which the pointer device is pivotally mounted for adjustment about the axis of the shaft, herein by a rivet 15, which permits radial adjustment of the pointer device across the face of the chart. Preferably the arm 14 is adjustably pivoted to the shaft 11, so as to be capable of angular adjustment about the axis of the latter, herein by wrapping a portion 16 of said arm about the shaft.

The shaft 11 may be connected to the responsive element 10 by suitable adjustable indicating means permitting the shaft to be adjusted to various different angular positions about its axis, so as to permit the mechanism to be adjusted for a uniformly graduated chart. To this end, there may be secured to the movable portion of the responsive element 10 and arm 17, and to this arm there may be adjustably secured a member 18 by suitable means permitting angular adjustment of the latter, herein consisting of a rivet 19 passing through suitable perforations provided in the arm 17 and member 18. Preferably the rivet 19 has suitable provision to permit the member 18 to be angularly adjusted with reference to the arm 17 by simply forcibly swinging one upon the other, and yet holding the parts in a desired position of adjustment. To this end, the rivet 19 may be provided with a head 20, having a concaved portion or recess 21 in its under side so formed that only the margin of the head rests upon the member 18. The head therefore constitutes a species of spring washer connecting the parts by a frictional engagement. The member 18 may be adjustably secured to another member herein an arm 22 by suitable means permitting angular adjustment of said members with respect to each other, herein a rivet 23 similar to the rivet 19.

The member 22 may be connected to the shaft 11 by a suitable operative connection, herein a link 24 pivoted at one end to said member, and at its other end to an arm 25 secured to the shaft. Preferably this link is provided with suitable means to prevent lost motion in its pivotal connections. To that end the link may be pivotally connected to the member 22 and the arm 25 by pivots 26 and 27 passing through suitable perforations in the link, in the member, and in the arm, and these pivots may be formed as the legs of a U-shaped member 28, having an intermediate resilient portion 29, which serves to urge the two pivots in opposite directions respectively against the walls of the perforations in the link 24. In practice, the lost motion, or play, is very slight, and therefore it has been shown somewhat exaggerated in Fig. 5, for the purpose of illustration. Preferably, the link 24 is made double (see Fig. 5), and is preferably though not necessarily formed in a single piece. If desired, the link 24 may be adjusted toward and away from the axis of the shaft by providing an arm 25 with a plurality of perforations 30 to receive the pivot 27.

It will now be evident that after the recording mechanism has been assembled and placed in its case, the pointer device may be adjusted to a uniformly graduated chart by suitable adjustment of the member 18 with respect to the arm 17, adjustment of the member 22 with respect to the member 18, and adjustment of the arm 14 with respect to the shaft 11. These various parts may be angularly adjusted one upon another by simply applying sufficient force and the parts will remain in the desired position of adjustment. It will of course be evident that by changing the angular relation of these parts in various ways, the pointer device may be caused to move through equal spaces corresponding to equal variations in pressure, and accordingly the pointer may be adjusted to permit the use of a uniform chart. When the instrument has thus been adjusted, the adjustment may be permanently retained by simply soldering the rivets 19 and 23 and the portion 16 of the arm 14. The rivet 15, however, will remain free for adjustment, while the instrument is in use, and since this rivet is on the same axis as the shaft, the pointer device will always follow the time division arc on the chart.

While I have herein shown and described one form of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made without departing from the principles thereof.

Having thus described one embodiment of my invention, what I claim is:

1. In an instrument of the class described, the combination of a pointer device, a responsive member to govern movement of said pointer device, and means connecting said pointer device and responsive member including a link, pivots for opposite ends of said link, and resilient means directly connecting said pivots to each other and urging the latter in opposite directions thereby to prevent lost motion in the joints of the pivotal connections.

2. In an instrument of the class described, the combination of a pointer device, a responsive member to govern movement of said pointer device, and means connecting said pointer device and responsive member including two arms, a link having pivotal connection at its opposite ends with said arms, pivots for opposite ends of said link, and resilient means directly connecting said pivots to each other and urging the latter in opposite directions thereby to prevent lost motion in the joints of the pivotal connections.

3. In an instrument of the class described, the combination of a pointer device, a responsive member to govern movement of the pointer device, and means connecting said pointer device and responsive member including a link having holes adjacent its opposite ends, pivots located in said holes, respectively, and yielding means directly connecting said pivots to urge the latter in opposite directions, respectively, against the walls of said holes.

4. In an instrument of the class described, the combination of a pointer device, a responsive member to govern movement of the pointer device, and means connecting said pointer device and responsive member including a link having two holes therein, a U-shaped member having two legs constituting pivots located in said holes, and a resilient connecting portion acting to urge said pivots in opposite directions, respectively, against the walls of said holes.

5. In an instrument of the class described, the combination of a pointer device arranged for oscillation about an axis, a responsive member to govern movement of said pointer device, a shaft upon which said pointer device is supported, means providing for angular adjustment of said pointer device with relation to said shaft, and mechanism operatively connecting said responsive member to said shaft, said mechanism including adjustable means for adjusting said mechanism to cause said pointer device to follow a uniformly graduated chart.

6. In an instrument of the class described, the combination of a pointer device arranged for oscillation about an axis, a responsive member to govern movement of said pointer device, an arm upon which said pointer device is supported, adjustable connecting means between said arm and said pointer device providing for angular adjustment of the latter with relation to said arm, and means operatively connecting said responsive member with said arm, the last-mentioned means including means providing for adjustment of said arm about said axis.

7. In an instrument of the class described, the combination of a pointer device arranged for oscillation about an axis, responsive means to govern movement of said pointer device, a shaft to which said pointer device is connected to be oscillated, adjustable connecting means between said responsive member and said shaft to cause said pointer device to follow a uniformly graduated chart, said adjustable connecting means including two members, and means permitting angular adjustment of said members and having provision to hold said members in definite angular position with relation to each other during the operation of the instrument.

8. In an instrument of the class described, the combination of a pointer device arranged for oscillation about an axis, responsive means to govern movement of said pointer device, a shaft to which said pointer device is connected to be oscillated, and adjustable connecting means between said responsive means and shaft to cause said pointer device to follow a uniformly graduated chart, said adjustable connecting means including three members, and means permitting angular adjustment of each of said members with respect to the others and having provision to hold said members in definite angular position with relation to each other during the operation of the instrument.

9. In an instrument of the class described, the combination of a pointer device arranged for oscillation about an axis, responsive means to govern movement of said pointer device, a shaft to which said pointer device is connected to be oscillated, and adjustable connecting means between said responsive means and said shaft to cause said pointer to follow a uniformly graduated chart, said adjustable connecting means including a member rigidly secured to said responsive means, a second member operatively connected to said shaft, a third member interposed between the first and second members, and means permitting angular adjustment of the second member with relation to the first and angular adjustment of the third member with relation to the second and having provision to hold said members in definite angular position with relation to each other during the operation of the instrument.

10. In an instrument of the class described, the combination of a pointer device arranged for oscillation about an axis, responsive means to govern movement of said pointer device, a shaft to which said pointer device is connected to be oscillated, an arm secured to said shaft, a link having one end pivotally connected to said arm, and adjustable means connecting the other end of said link to said responsive device to cause said pointer device to follow a uniformly graduated chart, said adjustable means having provision to cause angular adjustment of itself with relation to said link and to cause angular adjustment of said link with relation to said arm.

11. In an instrument of the class described, the combination of a pointer device arranged for oscillation about an axis, responsive means to govern movement of said pointer device, a shaft to which said pointer device is connected to be oscillated, an arm secured to said shaft, a link having one end pivotally connected to said arm, and adjustable means connecting the other end of said link to said responsive device to cause said pointer device to follow a uniformly graduated chart, said adjustable means including an arm having one end secured to said responsive means and its other end pivotally connected to said link the last-mentioned arm having provision for adjusting the angular relation between itself and said link and the angular relation between said link and the first-mentioned arm.

12. In an instrument of the class described, the combination of a pointer device arranged for oscillation about an axis, responsive means to govern movement of said pointer device, a shaft to which said pointer device is connected to be oscillated, an arm secured to said shaft, a link having one end pivotally connected to said arm, adjustable means connecting the other end of said link to said responsive device to cause said pointer device to follow a uniformly graduated chart, said adjustable means including an arm having one end secured to said responsive means and its other end pivotally connected to said link, the last-mentioned arm comprising a plurality of members angularly adjustable with relation to each other thereby to change the angular relation of said arm with respect to said link and the angular relation of said link with relation to the first-mentioned arm, and automatic friction means for normally maintaining such adjustment.

13. In an instrument of the class described, the combination of a pointer device arranged for oscillation about an axis, responsive means to govern movement of said responsive device, a shaft to which said pointer device is connected to be oscillated, an arm secured to said shaft, a link having one end pivotally connected to said arm, and adjustable means connecting the other end of said link to said responsive device to cause said pointer device to follow a uniformly graduated chart, said adjustable means including an arm having one end secured to said responsive means and its other end pivotally connected to said link, the last-mentioned arm having provision for adjusting the angular relation between itself and said link and the angular relation between said link and the first-mentioned arm, the latter having provision for adjustment of its pivotal connection with said link toward and from the axis of said shaft.

14. In an instrument of the class described, the combination of a pointer device arranged for oscillation about an axis, responsive means to govern movement of the pointer device, a shaft to which said pointer device is connected to be oscillated, and adjustable connecting means between said responsive member and said shaft, including two members, and a rivet securing said members to each other and permitting angular movement of one with respect to the other and having provision to hold said members in definite angular position with relation to each other during the operation of the instrument.

15. In an instrument of the class described, the combination of a shaft, an offset arm secured to said shaft, a pointer device adjustably pivoted on said arm on the axis of said shaft, and responsive means operatively connected to said shaft to govern the movement of said pointer device.

16. In an instrument of the class described, the combination of a shaft, an offset arm adjustably pivoted to said shaft upon the axis thereof, a pointer device adjustably pivoted on said arm on the axis of said shaft, and responsive means operatively connected to said shaft to govern the movement of said pointer device.

In testimony whereof, I have signed my name to this specification, in the presence of two subscribing witnesses.

EDGAR H. BRISTOL.

Witnesses:
   GEO. A. WROR,
   BESSIE E. JONES.